United States Patent
Lin et al.

(10) Patent No.: US 8,654,520 B2
(45) Date of Patent: Feb. 18, 2014

(54) SUPPORTING APPARATUS AND ELECTRONIC APPARATUS WITH SUPPORTING APPARATUS

(75) Inventors: Tian-Shyang Lin, Taipei (TW); Ming-Hua Hung, Taipei (TW); Shu-Chen Chiang, Taipei (TW); Wen-Chin Wu, Taipei (TW); Cheng-Lan Lee, Taipei (TW); Yen-Ting Pan, Taipei (TW)

(73) Assignee: Wistron Corporation, New Taipei (TW)

( * ) Notice: Subject to any disclaimer, the term of this patent is extended or adjusted under 35 U.S.C. 154(b) by 61 days.

(21) Appl. No.: 13/535,786

(22) Filed: Jun. 28, 2012

(65) Prior Publication Data

US 2013/0242521 A1   Sep. 19, 2013

(30) Foreign Application Priority Data

Mar. 13, 2012   (TW) .............................. 101204508 A

(51) Int. Cl.
*H05K 5/00* (2006.01)
*H05K 7/00* (2006.01)
*G06F 1/16* (2006.01)

(52) U.S. Cl.
USPC ............ 361/679.27; 361/679.02; 361/679.26; 361/679.8; 361/679.55

(58) Field of Classification Search
USPC ............ 361/679.02, 679.26, 679.27, 679.28, 361/679.55
See application file for complete search history.

(56) References Cited

U.S. PATENT DOCUMENTS

| | | | |
|---|---|---|---|
| 6,006,243 A * | 12/1999 | Karidis ......................... 708/100 |
| 6,430,038 B1 * | 8/2002 | Helot et al. .............. 361/679.05 |
| 6,437,973 B1 * | 8/2002 | Helot et al. .............. 361/679.29 |
| 6,504,707 B2 * | 1/2003 | Agata et al. .............. 361/679.05 |
| 7,035,090 B2 * | 4/2006 | Tanaka et al. ............. 361/679.21 |
| 7,184,263 B1 | 2/2007 | Maskatia |
| 7,273,089 B2 * | 9/2007 | Hata et al. ................ 165/104.33 |
| 7,724,511 B2 * | 5/2010 | Jacobs ..................... 361/679.27 |
| 8,264,828 B2 * | 9/2012 | Chang et al. ............. 361/679.28 |
| 8,369,076 B2 * | 2/2013 | Chuang et al. ........... 361/679.27 |
| 8,520,377 B2 * | 8/2013 | Senatori ................... 361/679.27 |
| 2004/0057197 A1* | 3/2004 | Hill et al. ....................... 361/683 |
| 2005/0105263 A1* | 5/2005 | Tanaka et al. ................. 361/683 |
| 2008/0081505 A1* | 4/2008 | Ou et al. ....................... 439/374 |

FOREIGN PATENT DOCUMENTS

TW   584227   4/2004

* cited by examiner

*Primary Examiner* — Anthony Haughton
(74) *Attorney, Agent, or Firm* — Muncy, Geissler, Olds & Lowe, P.C.

(57) ABSTRACT

A supporting apparatus is used in an electronic apparatus that has a display device, a support base, and a transmission component. The display device is supported by the supporting apparatus and an angle is formed between the display device and the support base. The supporting apparatus includes a first support element, a second support element, a plurality of second axial levers, a first connecting element, and a second connecting element. The first support element is pivotally connected to the display device. The second support element is pivotally connected to the support base. Two ends of the first connecting element are respectively pivotally connected to the first support element and the second support element. Two ends of the second connecting element are respectively pivotally connected to the first support element and the second support element.

22 Claims, 8 Drawing Sheets

SUPPORTING APPARATUS AND ELECTRONIC APPARATUS WITH SUPPORTING APPARATUS

BACKGROUND OF THE INVENTION

1. Field of the Invention

The present invention is related to a supporting apparatus and an electronic apparatus with the supporting apparatus; more particularly, it relates to a supporting apparatus for providing multiple viewing angles of an electronic apparatus.

2. Description of the Related Art

With rapid development of computer technology, the use of tablet computers has become widely popular. Although they are light-weight and not cumbersome, users need to hold them with their hands in order to keep them upright or tilted so that the tablet computers are face-on to the users during actual operation. Therefore, when compared with traditional laptop computers, the monitors of which stay upright or tilted when they are placed on a desktop or on a lap, the tablet computers are not designed in accordance with the general users' habits of using laptops, nor with ergonomics. In addition, although most tablet computers have a touch function to provide intuitive operation, most users are accustomed to using a keyboard for word processing. For this reason, in order to enable users to use tablet computers with more ease when it comes to long hours of use, various support bases with keyboards or other extension components have been invented.

SUMMARY OF THE INVENTION

One aspect of the present invention is to provide a supporting apparatus. The supporting apparatus is applied to an electronic apparatus. The electronic apparatus includes a display device, a support base, and a transmission component. The support base is used for supporting the display device such that the display device leans on the support base such that the display device is capable of being placed on the support base upright or slopingly to form a clamping angle between the display device and the support base. The display device is electrically connected to the support base via the transmission component. The supporting apparatus includes a first support element, a second support element, a plurality of second axial levers, a first connecting element, and a second connecting element. The first support element is pivotally connected to the display device such that the first support element can be rotated relative to the display device. The first support element includes a first groove for holding the transmission component. The second support element is pivotally connected to the support base such that the second support element can be rotated relative to the support base. The second support element includes a second groove for holding the transmission component. Two ends of the first connecting element are respectively pivotally connected to the first support element and the second support element via at least two second axial levers of the plurality of second axial levers such that the first connecting element can be rotated relative to the first support element and the second support element, respectively. Two ends of the second connecting element are respectively pivotally connected to the first support element and the second support element via other at least two second axial levers of the plurality of second axial levers such that the second connecting element can be rotated relative to the first support element and the second support element, respectively. By such, the first support element and the second support element can be moved in parallel and the opposite directions via the rotation of the first connecting element and the second connecting element to adjust the length of the supporting apparatus and consequently to change the angle.

Another aspect of the invention is to provide an electronic apparatus. The electronic apparatus includes a display device, a support base, a transmission component, and the aforementioned supporting apparatus. The transmission component is electrically connected to the display device and the support base such that the display device is electrically connected to the support base via the transmission component. The support base is used for supporting the display device to allow the display device to lean on the support base such that the display device is capable of being placed on the support base upright or slopingly to form a clamping angle between the display device and the support base, and the clamping angle can be changed by means of adjusting the length of the supporting apparatus.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
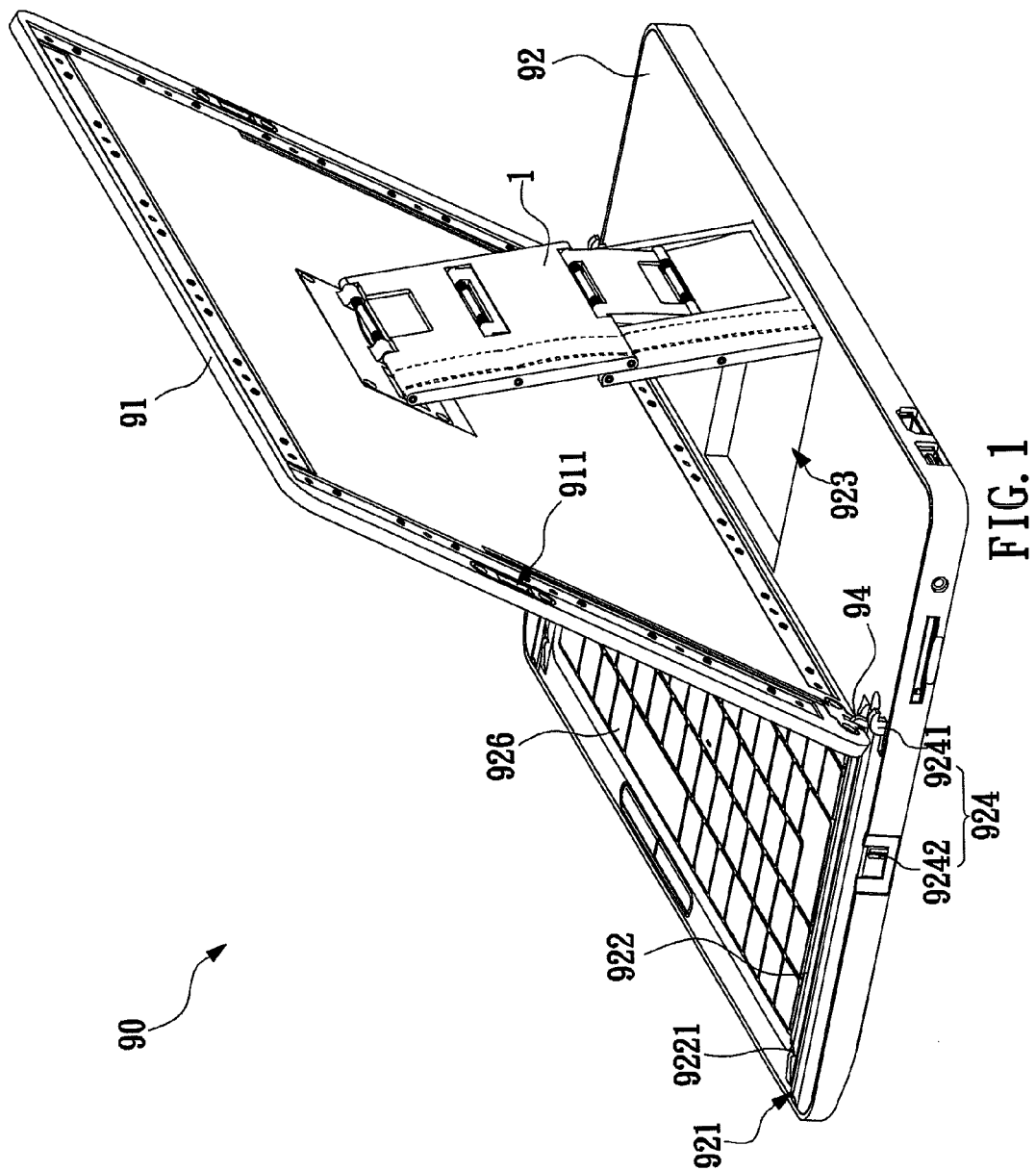
FIG. 1 is a back view diagram of an electronic apparatus of a first embodiment of the present invention.
Figure 2:
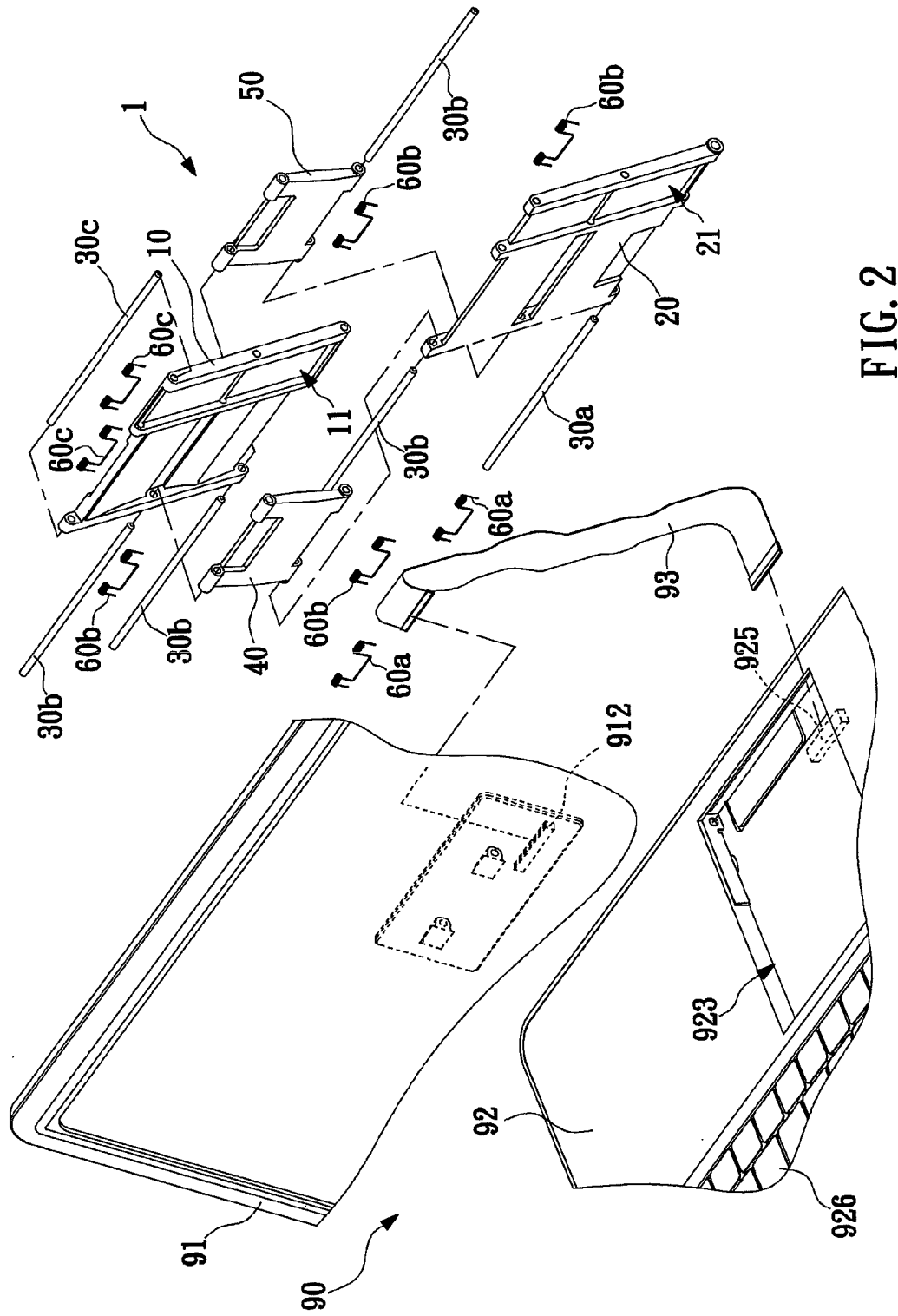
FIG. 2 is an exploded view diagram for the electronic apparatus of the first embodiment of the present invention.

Please refer to FIG. 1 and FIG. 2, which are structural diagrams of an electronic apparatus of the present invention. FIG. 1 is a back view diagram of an electronic apparatus of a first embodiment of the present invention and FIG. 2 is an exploded view diagram of the electronic apparatus of the first embodiment of the present invention.

As illustrated in FIG. 1, in the first embodiment of the present invention, a supporting apparatus 1 is applied to an electronic apparatus 90. The electronic apparatus 90 includes a display device 91, a support base 92, a transmission component 93, a pair of linkage levers 94, and a supporting apparatus 1.

The display device 91 includes a pair of buttonholes 911 and a first electrical connector 912. In the embodiments of the present invention explained as follows, the display device 91 is a tablet computer, but this should not be regarded as a limitation of the scope of the present invention.

The support base 92 includes a pair of sliding grooves 921, a pair of convex rails 922, a holding groove 923, a pair of fixing devices 924, a second electrical connector 925, and a keyboard 926. The pair of sliding grooves 921 are respectively located at the left side and the right side of the keyboard 926 for holding the linkage lever 94 within. The convex rail 922 is used for placing the display device 91 thereon such that the display device 91 slides with the convex rail 922. The convex rail 922 includes a concave groove 9221 that allows the display device 91 to lean thereon. The holding groove 923 is used for holding the supporting apparatus 1 when the display device 91 is placed on the support base 92 in a lying state and fixed to the support base 92. The fixing device 924 is used for fixing the display device 91 when the display device 91 is placed on the support base 92 in a lying state. In the embodiments of the present invention, each fixing device 924 includes a hook 9241 and a switch element 9242. The switch element 9242 is connected to the hook 9241 for moving the hook 9241. The hook 9241 is used for hooking within the buttonhole 911 of the display device 91, such that the display device 91 is fixed by the hook 9241.

Two ends of the transmission component 93 are respectively plugged into the first electrical connector 912 and the second electrical connector 925 such that the display device 91 is electrically connected to the support base 92 via the transmission component 93. In the embodiments of the present invention, the transmission component 93 of the present invention is a flexible printed circuit, but this should not be regarded as a limitation of the scope of the invention.

One end of each linkage lever 94 is connected to the display device 91, and the other end of the linkage lever 94 is installed within the sliding groove 921 to connect to the support base 92. The linkage lever 94 is able to slide within the sliding groove 921 such that each linkage lever 94 is moved when the display device is moved.

As illustrated in FIG. 2, the supporting apparatus 1 includes a first support element 10, a second support element 20, a first axial lever 30a, four second axial levers 30b, a third axial lever 30c, a first connecting element 40, a second connecting element 50, two first elastic components 60a, eight second elastic components 60b, and two third elastic components 60c.

The first support element 10 is pivotally connected to the display device 91 via the third axial lever 30c such that the first support element can be rotated relative to the display device 91. The first support element 10 includes a first groove 11 for holding the transmission component 93.

The second support element 20 is pivotally connected to the support base 92 via the first axial lever 30a such that the second support element 20 can be rotated relative to the support base 92. The second support element 20 includes a second groove 21 for holding the transmission component 93.

Two ends of the first connecting element 40 are respectively pivotally connected to the first support element 10 and the second support element 20 via two the second axial levers 30b such that the first connecting element 40 can be rotated relative to the first support element 10 and the second support element 20, respectively.

Two ends of the second connecting element 50 are respectively pivotally connected to the first support element 10 and the second support element 20 via the other two second axial levers 30b such that the second connecting element 50 can be rotated relative to the first support element and the second support element 20, respectively.

The first elastic components 60a are mounted on the first axial levers 30a and used for providing an elastic force. When the display device 91 is not fixed to the support base 92, the elastic force provided by the first elastic components 60a is used for raising the second support element 20 by rotating relative to the support base 92.

The second elastic components 60b are respectively mounted on the second axial levers 30b in pairs. The second elastic components 60b are used for providing an elastic force for supporting the first support element 10 and the display device 91.

The third elastic components 60c are mounted on the third axial lever 30c and used for providing elastic force for supporting the display device 91 so as to keep an opening angle between the display device 91 and the first support element 10.

Figure 3:
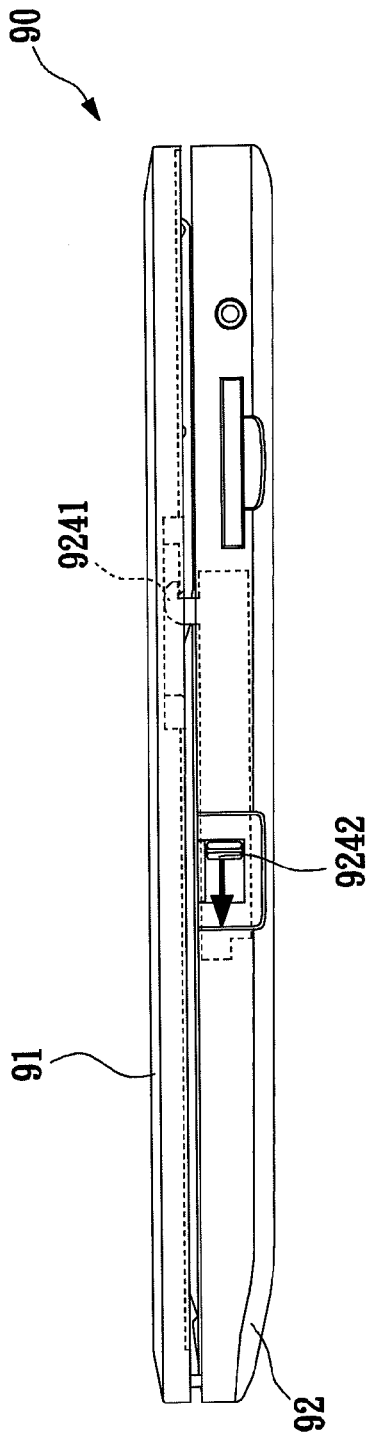
FIG. 3 is a lateral view diagram of a display device and a support base of the electronic apparatus of the first embodiment of the present invention.
Figure 4:
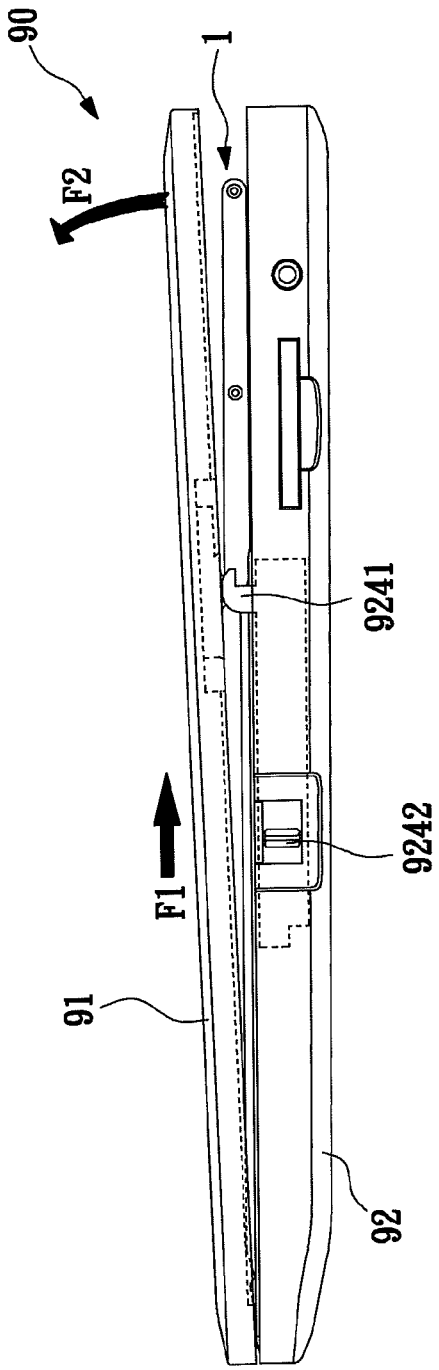
FIG. 4 is a lateral view diagram illustrating that the display device of the electronic apparatus of the first embodiment of the present invention springs upward when the display device is not fixed to the support base.
Figure 5:
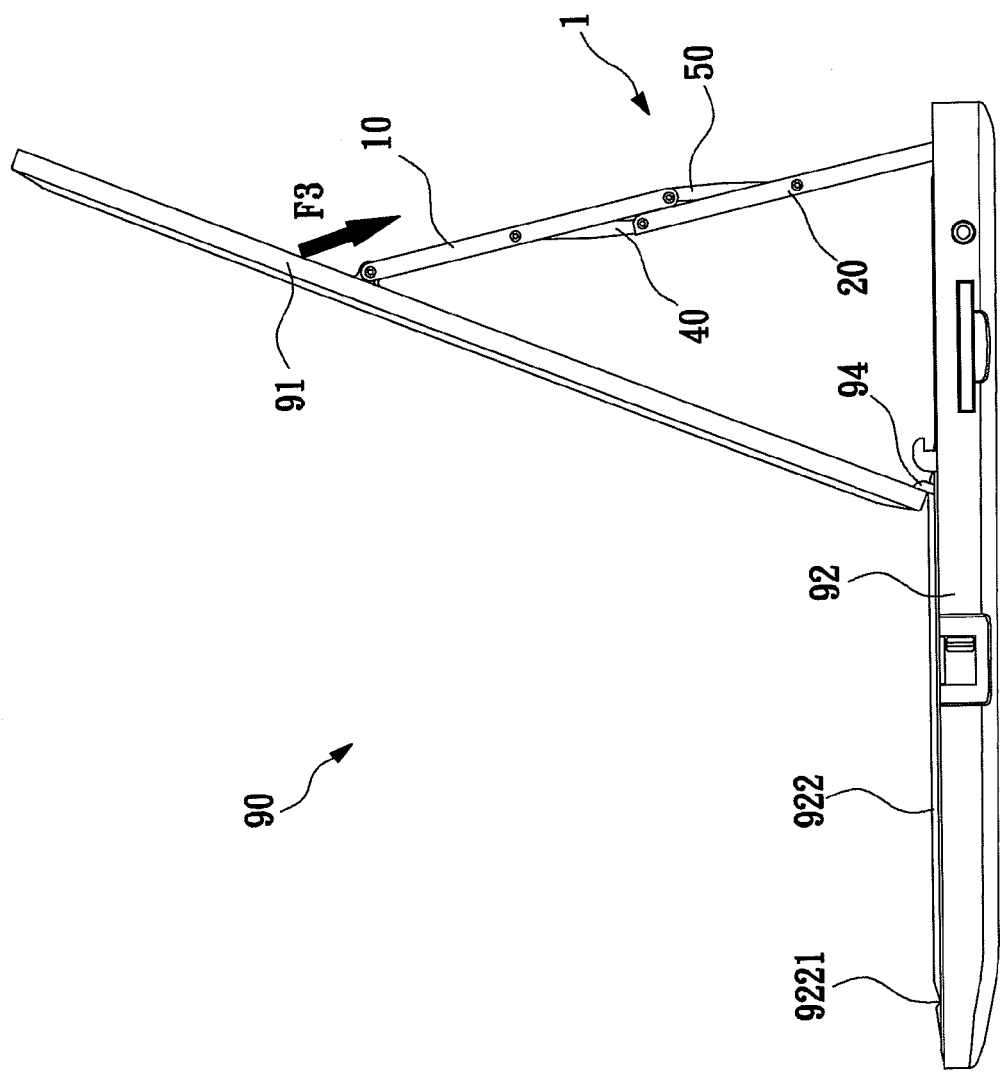
FIG. 5 is a lateral view diagram illustrating that the angle between the display device and the support base of the present invention is a first angle.
Figure 6:
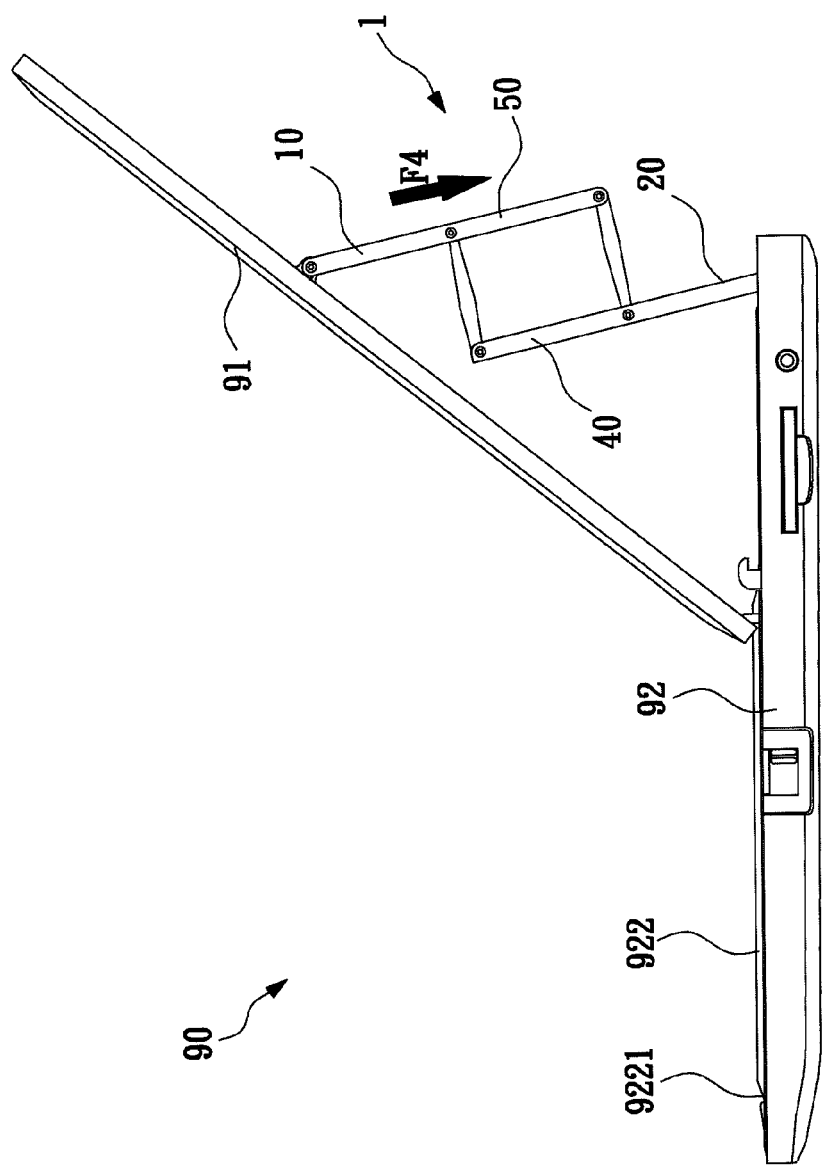
FIG. 6 is a lateral view diagram illustrating that the angle between the display device and the support base of the present invention is a second angle.
Figure 7:
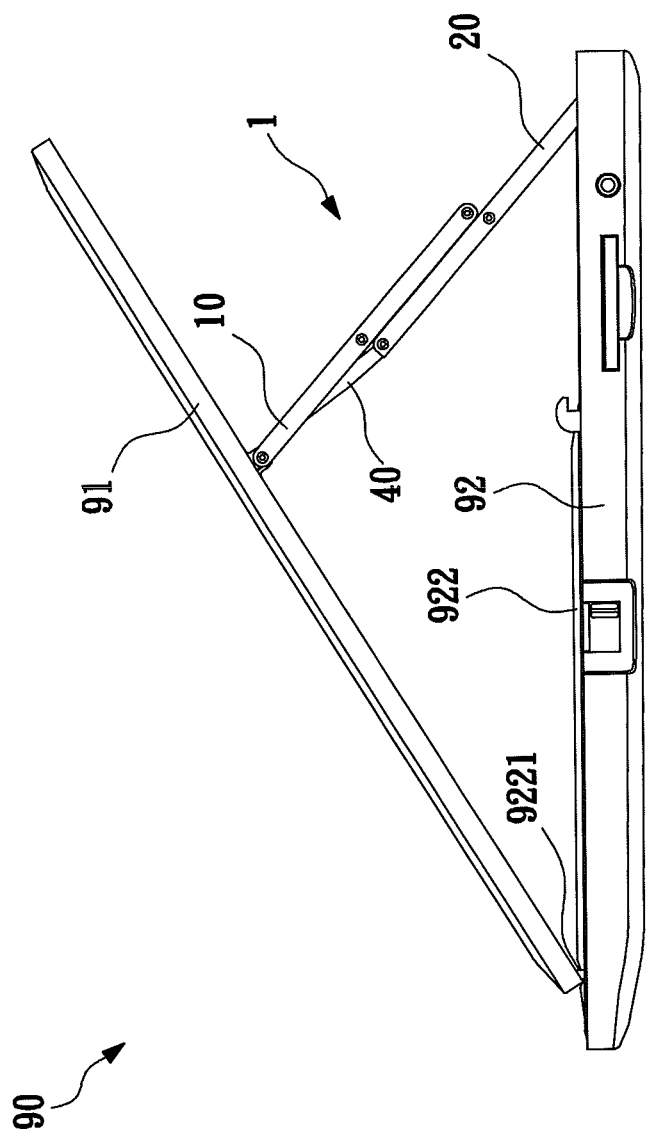
FIG. 7 is a lateral view diagram illustrating that the angle between the display device and the support base of the present invention is a third angle.
Figure 8:
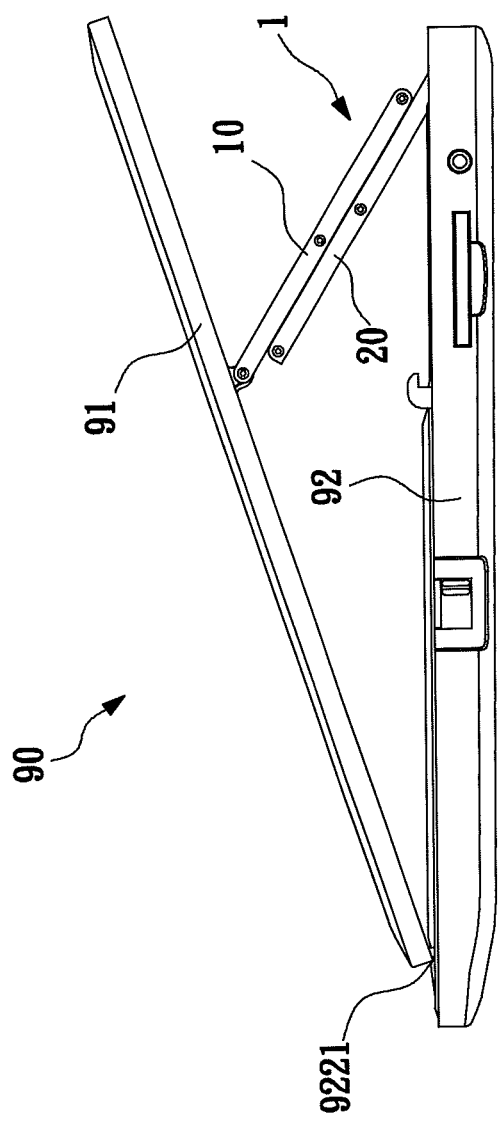
FIG. 8 is a lateral view diagram illustrating that the angle between the display device and the support base of the present invention is a third angle.

Referring to FIG. 1 and FIG. 2, while referring to FIG. 3 to FIG. 8 at the same time. FIG. 3 is a lateral view diagram illustrating the first embodiment of the present invention where the electronic apparatus is fixed to the support base. FIG. 4 is a lateral view diagram to illustrate that the electronic apparatus of the first embodiment of the present invention is not fixed to the support base and springs upwardly. FIG. 5 is a lateral view diagram illustrating that the angle between the display device and the support base of the present invention is a first angle. FIG. 6 is a lateral view diagram illustrating that the angle between the display device and the support base of the present invention is a second angle. FIG. 7 is a lateral view diagram illustrating that the angle between the display device and the support base of the present invention is a third angle. FIG. 8 is a lateral view diagram illustrating that the angle between the display device and the support base of the present invention is a fourth angle.

As illustrated in FIG. 1, FIG. 2, and FIG. 3, in the first embodiment of the present invention, when the display device 91 is placed on the support base 92 in a lying state as shown in FIG. 3, the supporting apparatus 1 is held within the holding groove 923 of the support base 92 and the hook 9241 is hooked within the buttonhole 911 of the display device 91 so as to fix the display device 91 to the support base 92; in this state, the electronic apparatus 90 can be used as a tablet computer. When a user moves the switch element 9242 in the direction indicated by the arrow in FIG. 3, the switch element 9242 controls the hook 9241 to be moved such that the hook 9241 leaves the buttonhole 911. When the hook 9241 leaves the buttonhole 911, the second support element 20 of the supporting apparatus 1 rises with rotation relative to the support base 91 via the elastic force provided by the first elastic component 60a. With support by the supporting apparatus 1, the display device 91 can move slightly and automatically to the predetermined position shown in FIG. 4, such that the user may directly slide or move the display device 91 after unfixing the fixed status between the display device 91 and the support base 92. Therefore, the user does not need to separate the display device 91 and the support base 92 manually.

As illustrated in FIG. 1, FIG. 4, and FIG. 5, when the display device 91 is supported and moved to the predetermined position, the user may move the display device 91 backward (in the direction of the arrow F1 shown in FIG. 4), such that the display device 91 slides backward along the convex rails 922. As it slides, the display device 91 gradually rises upward in the direction of F2 illustrated in FIG. 4. Finally, when the linkage levers 94 connected to the display device 91 move to the final end of the sliding grooves 921, the display device 91 can lean on the support base with a side of the display device 91 such that the display device 91 is placed on the support base upright or slopingly with the support of the supporting apparatus 1; in this state, the electronic apparatus 90 can be used as a laptop computer.

As illustrated in FIG. 2, FIG. 5, and FIG. 6, when the user presses downward in the direction of the arrow illustrated in FIG. 5, the first support element 10 of the supporting apparatus 1 moves downward along the pressing direction. Because the length of the supporting apparatus 1 is changed, the clamping angle between the display device 91 and the support base 92 is changed accordingly, such that the electronic apparatus 90 appears as illustrated in FIG. 6. Thus it may provide the user with a different viewing angle.

As illustrated in FIG. 2 and FIG. 7, the display device 91 of the electronic apparatus 90 can also be moved forward to lean on the different locations of the support base 92 by the concave groove 9221 of the convex rail 922 to allow the electronic apparatus 95 to form more viewing angles. Moreover, when the display device 91 leans on any location of the support base 92, the viewing angle of the electronic apparatus 90 can be further changed as illustrated in FIG. 8 by adjusting the length of the supporting apparatus 1. Therefore, the clamping angle between the display device 91 and the support base 92 of the present invention not only can be changed by moving the location where the display device 91 leans upon but also by adjusting the length of the supporting apparatus 1. Thus, more viewing angles are provided with such a design.

It is to be noted that although only one concave groove 9221 is disposed in each convex rail 922 in the embodiments of the present invention, such an arrangement should not be construed as a limitation of the present invention. More concave grooves 9221 can be disposed on different positions on the convex rail 922 to provide more fixing locations where the display device 91 leans thereon so as to provide more variation in the clamping angle between the display device 91 and the support base 92 by more changes of positions where the display device 91 leans thereon. It is also to be noted that although the supporting apparatus 1 uses the elastic force of the elastic components 60a, 60b, and 60c as the source of supporting force, such a design should not be construed to limit the present invention. The supporting apparatus 1 of the present invention can also use axial levers with high friction coefficients. In this case, friction force between the axial levers and the support elements or the connecting elements can be used as source of supporting force. When each connecting element is rotated with multiple angles relative to each of the support element via the axial levers, the length of the supporting apparatus 1 can be adjusted within the maximum extendible range so that the clamping angle between the display device 91 and the support base 92 can have even more variations, even if the display device 91 is located on the same location of the support base 92.

Figure 9:
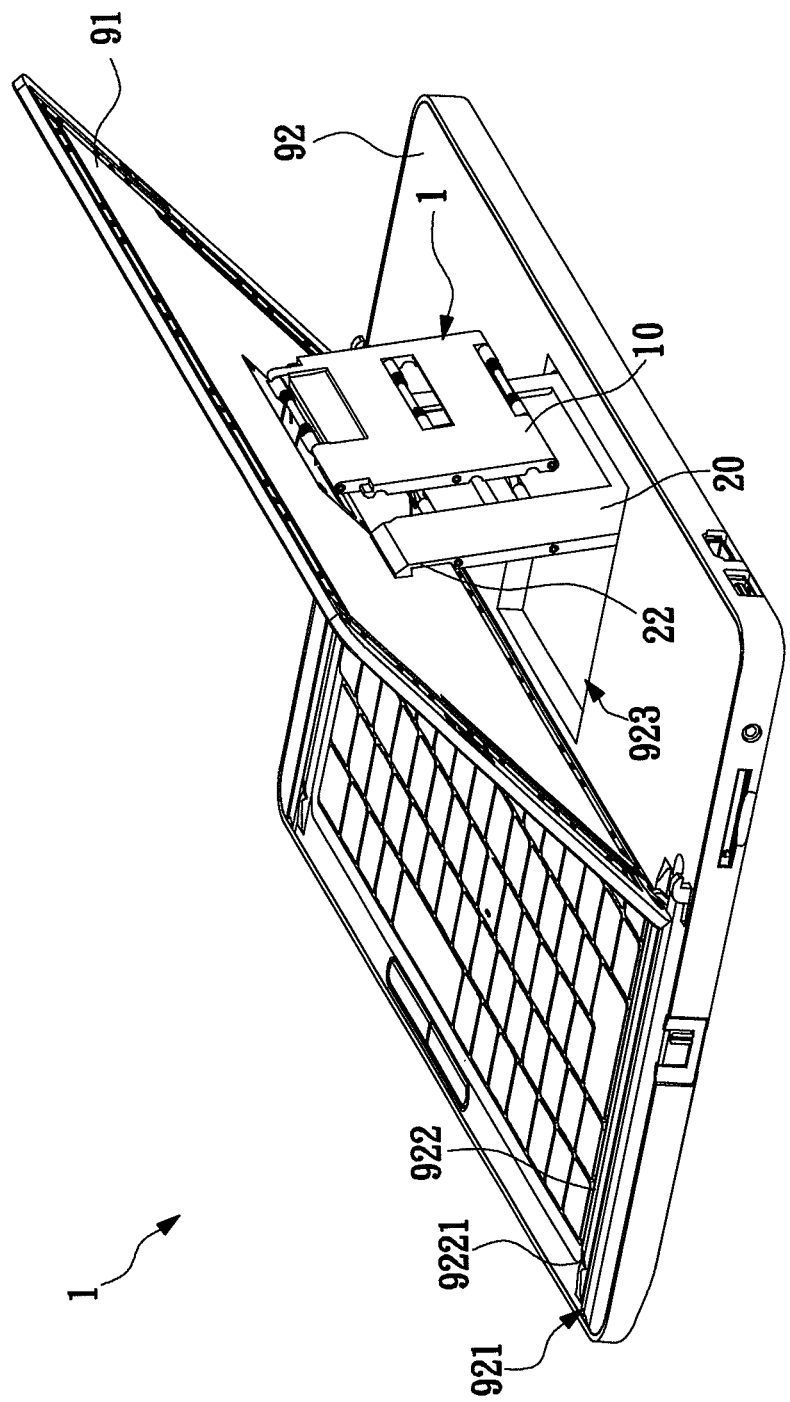
FIG. 9 is a back view diagram of the second embodiment of the present invention.

Finally, please refer to FIG. 2, FIG. 6, and FIG. 9, wherein FIG. 9 is a back view diagram of a second embodiment according to the present invention.

As illustrated in FIG. 2 and FIG. 6, when the supporting apparatus 1 supports the display device 91 as illustrated in FIG. 6, because the display device 91 is supported only with the elastic force of the elastic components 60a, 60b, and 60c, the display device 91 will move backward in the direction of the arrow F4 in FIG. 6 if the force generated by the pressing of the user is greater than the elastic force provided by the elastic components 60a, 60b, and 60c. Thus the display device 91 could not be operated steady. To eliminate such a deficiency, as illustrated in FIG. 6 and FIG. 9 in the second embodiment of the present invention, two sides of the second support element 20 of the supporting apparatus 1 are extended and formed as two support portions 22 (the other side is not shown because of the viewing angle). With such a design, when the supporting apparatus 1 supports the display device 91 in the manner of FIG. 6, the support portions 22 can be used to support the display device 91 such that the display device 91 not only can be supported by the elastic force provided the elastic components 60a, 60b, and 60c but also by the reactive force provided by the support portions 22. Therefore, the display device 91 can also be operated robustly in this state to cure the aforementioned problem.

It is also to be noted that for clarity and simplicity, only preferred embodiments are explained, and not all possible variations and combinations are listed. Persons of ordinary skill in the art, however, can understand that not every component mentioned above is necessary. Moreover, to implement the present invention, other conventional components can be added in more detail. Each component can be ignored or modified, and additional components may exist between two existing components. For example, when the display device 91 or the support base 92 has an axial lever, the first axial lever 30a or the third axial lever 30c of the supporting apparatus 1 can be omitted.

The above descriptions of the embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A supporting apparatus used for an electronic apparatus, which comprises a display device, a support base, and a transmission component, the support base being used for supporting the display device to allow the display device to lean on the support base such that the display device is capable of being placed on the support base upright or slopingly to form a clamping angle between the display device and the support base, the display device being electrically connected to the support base via the transmission component, the supporting apparatus comprising:

a first support element pivotally connected to the display device, such that the first support element is capable of rotating relative to the display device, wherein the first support element comprises a first groove for holding the transmission component;

a second support element pivotally connected to the support base, such that the second support element is capable of rotating relative to the support base, wherein the second support element comprises a second groove for holding the transmission component;

a plurality of second axial levers;

a first connecting element, wherein two ends of the first connecting element are respectively pivotally connected to the first support element and the second support element via at least two second axial levers of the plurality of second axial levers such that the first connecting element is capable of rotating relative to the first support element and the second support element, respectively; and a second connecting element, wherein two ends of the second connecting element are respectively pivotally connected to the first support element and the second support element via at least other two second axial levers of the plurality of second axial levers such that the second connecting element is capable of rotating relative to the first support element and the second support element, respectively;

whereby the first support element or the second support element are movable by rotating the first connecting element or the second connecting element to adjust a length of the supporting apparatus for changing the clamping angle.

2. The supporting apparatus of claim 1, further comprising at least one first elastic component, wherein when the display device is placed on the support base in a lying state such that the display device is parallel to and corresponding to the support base and the display device is not fixed to the support base, an elastic force provided by the at least one first elastic component enables the raising of the second support element by rotating relative to the support base.

3. The supporting apparatus of claim 2, further comprising a first axial lever; the second support element is pivotally connected to the support base via the first axial lever, and the first elastic component is mounted on the first axial lever.

4. The supporting apparatus of claim 1, further comprising at least one second elastic component mounted on at least one second axial lever of the plurality of the second axial levers, such that the first support element and the display device are supported via an elastic force provided by the at least one second elastic component.

5. The supporting apparatus of claim 4, wherein the number of the plurality of second axial levers is four, and the number of the at least one second elastic components is eight; the eight second elastic components are mounted on the second axial levers in pairs.

6. The supporting apparatus of claim 1, further comprising at least one third elastic component, so as to maintain an opening angle between the display device and the first support element via an elastic force provided by the at least one third elastic component.

7. The supporting apparatus of claim 6, further comprising a third axial lever; the first support element is pivotally connected to the display device via the third axial lever, and the at least one third elastic component is mounted on the third axial level.

8. The supporting apparatus of claim 1, wherein the second support element comprises at least one support portion; the at least one support portion is formed by being extended outward from a side of the second support element.

9. An electronic apparatus comprising:
a display device;
a support base;
a transmission component electrically connected to the display device and the support base such that the display device is electrically connected to the support base via the transmission component; and
a supporting apparatus used for supporting the display device to allow the display device to lean on the support base such that the display device is capable of being placed on the support base upright or slopingly to form a clamping angle between the display device and the support base, the supporting apparatus comprising:
a first support element pivotally connected to the display device, such that the first support element is capable of rotating relative to the display device, wherein the first support element comprises a first groove for holding the transmission component;
a second support element pivotally connected to the support base, such that the second support element is capable of rotating relative to the support base, wherein the second support element comprises a second groove for holding the transmission component;
a plurality of second axial levers;
a first connecting element, wherein two ends of the first connecting element are respectively pivotally connected to the first support element and the second support element via at least two second axial levers of the plurality of second axial levers such that the first connecting element is capable of rotating relative to the first support element and the second support element, respectively; and
a second connecting element, wherein two ends of the second connecting element are respectively pivotally connected to the first support element and the second support element via at least other two second axial levers of the plurality of second axial levers such that the second connecting element is capable of rotating relative to the first support element and the second support element, respectively;
whereby the first support element or the second support element are movable by rotation of the first connecting element or the second connecting element to adjust a length of the supporting apparatus for changing the clamping angle.

10. The electronic apparatus of claim 9, wherein the supporting apparatus further comprises at least one first elastic component; when the display device is placed on the support base in a lying state such that the display device is parallel to and corresponding to the support base and the display device is not fixed to the support base, an elastic force provided by the at least one first elastic component enables the raising of the second support element by rotating relative to the support base.

11. The electronic apparatus of claim 10, wherein the supporting apparatus further comprises a first axial lever; the second support element is pivotally connected to the support base via the first axial lever, and the first elastic component is mounted on the first axial lever.

12. The electronic apparatus of claim 9, wherein the supporting apparatus further comprises at least one second elastic component mounted on at least one second axial lever of the plurality of the second axial levers, such that the first support element and the display device are supported via an elastic force provided by the at least one second elastic component.

13. The electronic apparatus of claim 12, wherein the number of the plurality of second axial levers is four, and the number of the at least one second elastic component is eight; the eight second elastic components are mounted on the second axial levers in pairs.

14. The electronic apparatus of claim 9, wherein the supporting apparatus further comprises at least one third elastic component, so as to maintain an opening angle between the display device and the first support element via an elastic force provided by the at least one third elastic component.

15. The electronic apparatus of claim 14, wherein the supporting apparatus further comprises a third axial lever; the first support element is pivotally connected to the display device via the third axial lever, and the at least one third elastic component is mounted on the third axial level.

16. The electronic apparatus of claim 9, wherein the second support element comprises at least one support portion; the at least one support portion is formed by being extended outward from a side of the second support element.

17. The electronic apparatus of claim 9, further comprising at least one linkage lever; the support base further comprises at least one sliding groove and at least one convex rail, wherein one end of the at least one linkage lever is connected to the display device, and the other end of the at least one linkage lever is installed within the at least one sliding groove for connecting to the support base, and the at least one linkage lever is movable within the at least one sliding groove.

18. The electronic apparatus of claim 17, wherein the at least one convex rail comprises a concave groove which allows the display device to lean it.

19. The electronic apparatus of claim 9, wherein the support base further comprises a holding groove; the holding groove is used for holding the supporting apparatus when the display device is placed on the support base in a lying state such that the display device is parallel to and corresponding to the support base.

20. The electronic apparatus of claim 9, wherein the support base comprises a fixing device used for fixing the display device when the display device is placed on the support base in a lying state such that the display device is parallel to and corresponding to the support base.

21. The electronic apparatus of claim 20, wherein the fixing device comprises a hook, and the display device comprises a buttonhole; the hook is used for hooking within the buttonhole so as to fix the display device to the support base.

22. The electronic apparatus of claim 21, wherein the fixing device further comprises a switch element connected to the hook for moving the hook.

* * * * *